(12) United States Patent
Tokizaki et al.

(10) Patent No.: US 10,756,584 B2
(45) Date of Patent: Aug. 25, 2020

(54) ELECTRIC MOTOR

(71) Applicant: Mitsuba Corporation, Kiryu-shi, Gunma (JP)

(72) Inventors: Teppei Tokizaki, Kiryu (JP); Yoshichika Kawashima, Kiryu (JP); Natsumi Tamura, Kiryu (JP)

(73) Assignee: Mitsuba Corporation, Gunma (JP)

( * ) Notice: Subject to any disclaimer, the term of this patent is extended or adjusted under 35 U.S.C. 154(b) by 518 days.

(21) Appl. No.: 15/560,187

(22) PCT Filed: Apr. 25, 2016

(86) PCT No.: PCT/JP2016/062937
§ 371 (c)(1),
(2) Date: Sep. 21, 2017

(87) PCT Pub. No.: WO2016/175181
PCT Pub. Date: Nov. 3, 2016

(65) Prior Publication Data
US 2018/0083501 A1    Mar. 22, 2018

(30) Foreign Application Priority Data

Apr. 28, 2015  (JP) .................................. 2015-091834

(51) Int. Cl.
*H02K 29/03*    (2006.01)
*H02K 23/04*    (2006.01)
(Continued)

(52) U.S. Cl.
CPC ................. *H02K 1/26* (2013.01); *H02K 1/17* (2013.01); *H02K 13/006* (2013.01); *H02K 23/40* (2013.01);
(Continued)

(58) Field of Classification Search
CPC ............................. H02K 29/03; H02K 23/04
(Continued)

(56) References Cited

U.S. PATENT DOCUMENTS

| | | | |
|---|---|---|---|
| 5,773,908 A | 6/1998 | Stephens et al. | |
| 2001/0038252 A1* | 11/2001 | Yamamoto | H02K 23/32 310/207 |

(Continued)

FOREIGN PATENT DOCUMENTS

| | | |
|---|---|---|
| CN | 101222153 A | 7/2008 |
| CN | 102035332 A | 4/2011 |

(Continued)

OTHER PUBLICATIONS

Chinese Patent Office, Office Action issued in CN 201680019031.9 dated Feb. 2, 2019, 12 pages.

(Continued)

*Primary Examiner* — Gary A Nash
(74) *Attorney, Agent, or Firm* — Wood Herron & Evans LLP

(57) ABSTRACT

In an electric motor (2) which includes four permanent magnets (12) and in which the number of teeth (20) and the number of slots (23) are set to 6, when a polar arc angle of the permanent magnet (12) is θ1, and a skew angle of the teeth (20) and the slots (23) is θ2, the polar arc angle θ1 and the skew angle θ2 are set so as to satisfy $50°≤θ1<70°$ and $0°<θ2≤20°$.

3 Claims, 10 Drawing Sheets

(51) Int. Cl.
*H02K 1/26* (2006.01)
*H02K 23/40* (2006.01)
*H02K 1/17* (2006.01)
*H02K 13/00* (2006.01)

(52) U.S. Cl.
CPC .......... *H02K 23/405* (2013.01); *H02K 29/03* (2013.01); *H02K 23/04* (2013.01); *H02K 2201/03* (2013.01); *H02K 2201/06* (2013.01); *H02K 2213/03* (2013.01)

(58) Field of Classification Search
USPC .............................................. 310/154.21, 195
See application file for complete search history.

(56) References Cited

U.S. PATENT DOCUMENTS

| | | | | |
|---|---|---|---|---|
| 2011/0198954 | A1* | 8/2011 | Saito | ........................ H02K 3/28 |
| | | | | 310/83 |
| 2013/0293054 | A1* | 11/2013 | Saito | ...................... H02K 23/34 |
| | | | | 310/195 |

FOREIGN PATENT DOCUMENTS

| | | | |
|---|---|---|---|
| CN | 102255437 | A | 11/2011 |
| CN | 202260673 | U | 5/2012 |
| JP | 60261344 | A | 12/1985 |
| JP | 62193539 | A | 8/1987 |
| JP | 63181633 | A | 7/1988 |
| JP | 11178301 | A | 7/1999 |
| JP | 2000253604 | A | 9/2000 |
| JP | 2002315237 | A | 10/2002 |
| JP | 2004270563 | A | 9/2004 |
| JP | 2008160908 | A | 7/2008 |
| JP | 2010093939 | A | 4/2010 |
| JP | 2011109909 | A | 6/2011 |
| JP | 2011166868 | A | 8/2011 |
| JP | 2013031284 | A | 2/2013 |

OTHER PUBLICATIONS

Japanese Patent Office, Office Action issued in corresponding JP 2015-091834 dated Sep. 25, 2018, 6 pages.
European Patent Office, Search Report issued in corresponding EP 16786458.6 dated Oct. 24, 2018, 12 pages.
PCT Office, International Search Report issued in PCT/JP2016/062937 dated Jul. 5, 2016, 4 pages.

* cited by examiner

ELECTRIC MOTOR

TECHNICAL FIELD

The present invention relates to an electric motor.

Priority is claimed on Japanese Patent Application No. 2015-091834, filed on Apr. 28, 2015, the contents of which are incorporated herein by reference.

BACKGROUND

For example, brush attached electric motors are usually used as a wiper motor of an automobile. In this type of electric motors, a plurality of permanent magnets are arranged on an inner circumferential surface of a yoke having a cylindrical shape at even intervals in a circumferential direction, and an armature is rotatably supported on an inner side of the permanent magnets. For the permanent magnets, a so-called segment-type permanent magnet that is formed in a substantially tegular shape (substantially arc shape) is used.

The armature has an armature core in which a plurality of teeth are radially formed. A plurality of slots that are elongated in an axial direction are formed between the teeth, and a winding wire is wound around the teeth via the slot. The winding wire is electrically connected to a commutator that is externally fitted and fixed to a rotation shaft so as to be adjacent to the armature core.

In the commutator, a plurality of segments which are metal pieces are arranged in the circumferential direction in a state of being insulated from each other, and a wind starting end and a wind finishing end of the winding wire are connected to each of the segments. Each of the segments is connected slidably to the brush, and electric power is supplied to each winding wire via the brush. Then, a magnetic field is formed at the teeth by the winding wire that is supplied with the electric power, and the armature is rotated by a magnetic suction force or repulsion force that occurs between the magnetic field and the permanent magnet provided on the yoke.

A variety of techniques are disclosed in order to reduce factors according to motor operation sounds such as a cogging torque and a torque ripple.

For example, a technique is disclosed in which the position of the arc center of the inner surface of a permanent magnet having a tegular shape is decentered with respect to the position of the arc center of the outer surface to prevent an abrupt magnetic flux change in the circumferential direction on the yoke side (for example, refer to Patent Document 1).

Further, a technique is disclosed in which a process is applied on an opposed surface of a permanent magnet of teeth to reduce a density change in a magnetic flux generated at the teeth (for example, refer to Patent Document 2).

Further, a technique is disclosed in which a polar arc angle of a permanent magnet is limited to thereby reduce a cogging torque (for example, refer to Patent Document 3).

Further, a technique is disclosed in which teeth or slots are formed to have a skew angle so as to diagonally extend with respect to an axial direction (for example, refer to Patent Document 4).

According to such a configuration, it is possible to shift, in the axial direction, occurrence timings of a magnetic suction force or repulsion force that occurs between a magnetic field by a winding wire and a permanent magnet provided on a yoke.

When teeth or slots have a skew angle, it is possible to derive an optimum skew angle from the lowest common multiple between the number of magnetic poles and the number of slots. That is, a value obtained by dividing 360° by the lowest common multiple between the number of magnetic poles and the number of slots is an optimum skew angle. For example, when the number of magnetic poles is 4 and the number of slots is 6, the lowest common multiple is 12, and the value obtained by dividing 360° by 12 is 30°. Accordingly, when the number of magnetic poles is 4 and the number of slots is 6, the optimum skew angle is 30°.

RELATED ART DOCUMENTS

Patent Documents

[Patent Document 1] Japanese Patent Application, First Publication No. 2000-253604
[Patent Document 2] Japanese Patent Application, First Publication No. 2013-31284
[Patent Document 3] Japanese Patent Application, First Publication No. 2011-166868
[Patent Document 4] Japanese Patent Application, First Publication No. 2002-315237

SUMMARY OF INVENTION

Problem to be Solved by the Invention

However, when the teeth or slots are formed at an optimum skew angle as described in Patent Document 4, there is a problem that the angle is too large, it is difficult to wind a winding wire around the teeth, and a work efficiency is degraded.

The present invention provides an electric motor capable of minimizing a cogging torque and a torque ripple without degrading a work efficiency.

Means for Solving the Problem

According to a first aspect of the present invention, an electric motor includes a yoke having a cylindrical part, four segment-type permanent magnets that are provided on an inner circumferential surface of the cylindrical part, and an armature that is rotatably supported on an inner side in a radial direction of the yoke, wherein the permanent magnet is formed so as to have a uniform thickness such that an outer surface and an inner surface have an arc shape, the armature includes a rotation shaft, an armature core that is fixed to the rotation shaft, and a commutator which is provided on the rotation shaft so as to be adjacent to the armature core and in which a plurality of segments are arranged in a circumferential direction, the armature core includes six teeth which radially extend along a radial direction and around which a coil is wound and six slots that are formed between the teeth and that extend along an axial direction, the teeth and the slots are formed to have a skew angle so as to diagonally extend with respect to an axial direction of the rotation shaft, and when a polar arc angle of the permanent magnet is θ1 and the skew angle is θ2, the polar arc angle θ1 and the skew angle θ2 are set so as to satisfy 50°≤θ1<70° and 0°<θ2≤20°.

According to a second aspect of the present invention, an electric motor includes a yoke having a cylindrical part, four segment-type permanent magnets that are provided on an inner circumferential surface of the cylindrical part, and an armature that is rotatably supported on an inner side in a radial direction of the yoke, wherein the permanent magnet is formed such that an outer surface and an inner surface have an arc shape, an arc center of the inner surface is further decentered toward a direction away from the permanent magnet along a thickness direction of a middle portion in a circumferential direction of the permanent magnet than an arc center of the outer surface, the armature includes a rotation shaft, an armature core that is fixed to the rotation shaft, and a commutator which is provided on the rotation shaft so as to be adjacent to the armature core and in which a plurality of segments are arranged in a circumferential direction, the armature core includes six teeth which radially extend along a radial direction and around which a coil is wound and six slots that are formed between the teeth and that extend along an axial direction, two grooves having a different groove width from each other are formed on a surface that faces the permanent magnet of the teeth throughout an entire axial direction of the rotation shaft, the teeth and the slots are formed to have a skew angle so as to diagonally extend with respect to the axial direction, and when a decentering amount of the arc center of the inner surface of the permanent magnet is δ, a polar arc angle of the permanent magnet is θ1 and the skew angle is θ2, the decentering amount δ, the polar arc angle θ1 and the skew angle θ2 are set so as to satisfy 0 mm<δ<3 mm, 70°≤θ1<80° and 0°<θ2≤20°.

According to a third aspect of the present invention, an electric motor includes a yoke having a cylindrical part, four segment-type permanent magnets that are provided on an inner circumferential surface of the cylindrical part, and an armature that is rotatably supported on an inner side in a radial direction of the yoke, wherein the permanent magnet is formed such that an outer surface and an inner surface have an arc shape, an arc center of the inner surface is further decentered toward a direction away from the permanent magnet along a thickness direction of a middle portion in a circumferential direction of the permanent magnet than an arc center of the outer surface, the armature includes a rotation shaft, an armature core that is fixed to the rotation shaft, and a commutator which is provided on the rotation shaft so as to be adjacent to the armature core and in which a plurality of segments are arranged in a circumferential direction, the armature core includes six teeth which radially extend along a radial direction and around which a coil is wound and six slots that are formed between the teeth and that extend along an axial direction, the teeth and the slots are formed to have a skew angle so as to diagonally extend with respect to an axial direction of the rotation shaft, and when a decentering amount of the arc center of the inner surface of the permanent magnet is δ, a polar arc angle of the permanent magnet is θ1 and the skew angle is θ2, the decentering amount δ, the polar arc angle θ1 and the skew angle θ2 are set so as to satisfy 3 mm≤δ≤4 mm, 80°≤θ1<90° and 0°<θ2≤20°.

Advantage of the Invention

According to the electric motor described above, it is possible to minimize a cogging torque and a torque ripple without setting a skew angle to an optimum skew angle that is obtained from the number of magnetic poles and the number of slots. Therefore, it is possible to provide an electric motor having an excellent motor efficiency without degrading a work efficiency.

DESCRIPTION OF THE EMBODIMENTS

Next, embodiments of the present invention are described with reference to the drawings.

(Speed Reducer Attached Motor)

Figure 1:
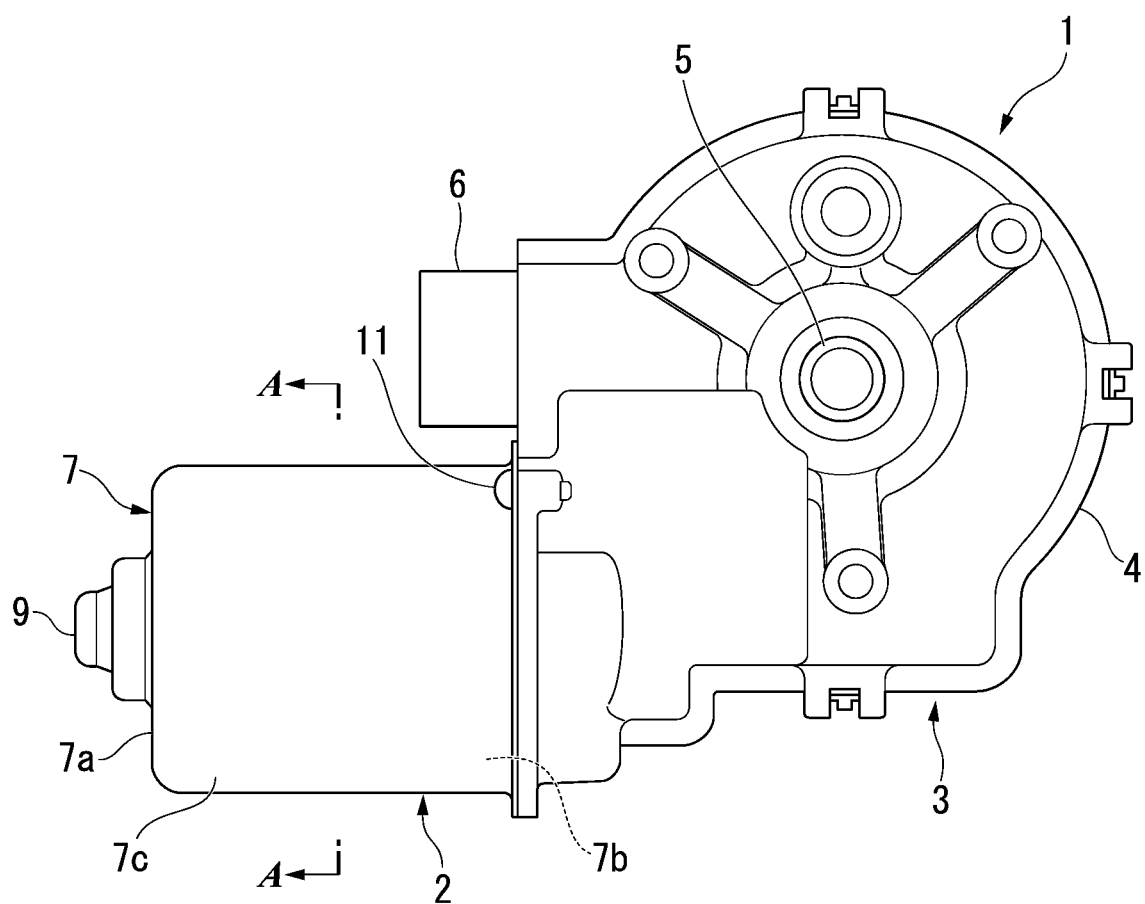
FIG. 1 is a plan view of a speed reducer attached motor in an embodiment of the present invention.

FIG. 1 is a plan view of a speed reducer attached motor 1 to which an electric motor 2 according to the present invention is applied.

As shown in FIG. 1, the speed reducer attached motor 1 is used, for example, as a wiper motor of an automobile. The speed reducer attached motor 1 includes the electric motor 2 and a speed reduction mechanism 3 that is joined to the electric motor 2.

The speed reduction mechanism 3 includes a casing 4, a worm speed reducer that is provided in the casing 4, and an output shaft 5 that is integrated with a worm wheel (not shown) which constitutes the worm speed reducer. A rotation force that is output from the electric motor 2 is output from the output shaft 5 via the worm speed reducer. The output shaft 5 is joined to a wiper mechanism (not shown), and the speed reducer attached motor 1 is driven to thereby drive the wiper mechanism.

A connector 6 is integrally provided on the casing 4. A connector of an external electric source (not shown) is connected to the connector 6. An electric power is supplied to the electric motor 2 via the connector 6.

First Embodiment (Electric Motor)

Figure 2:
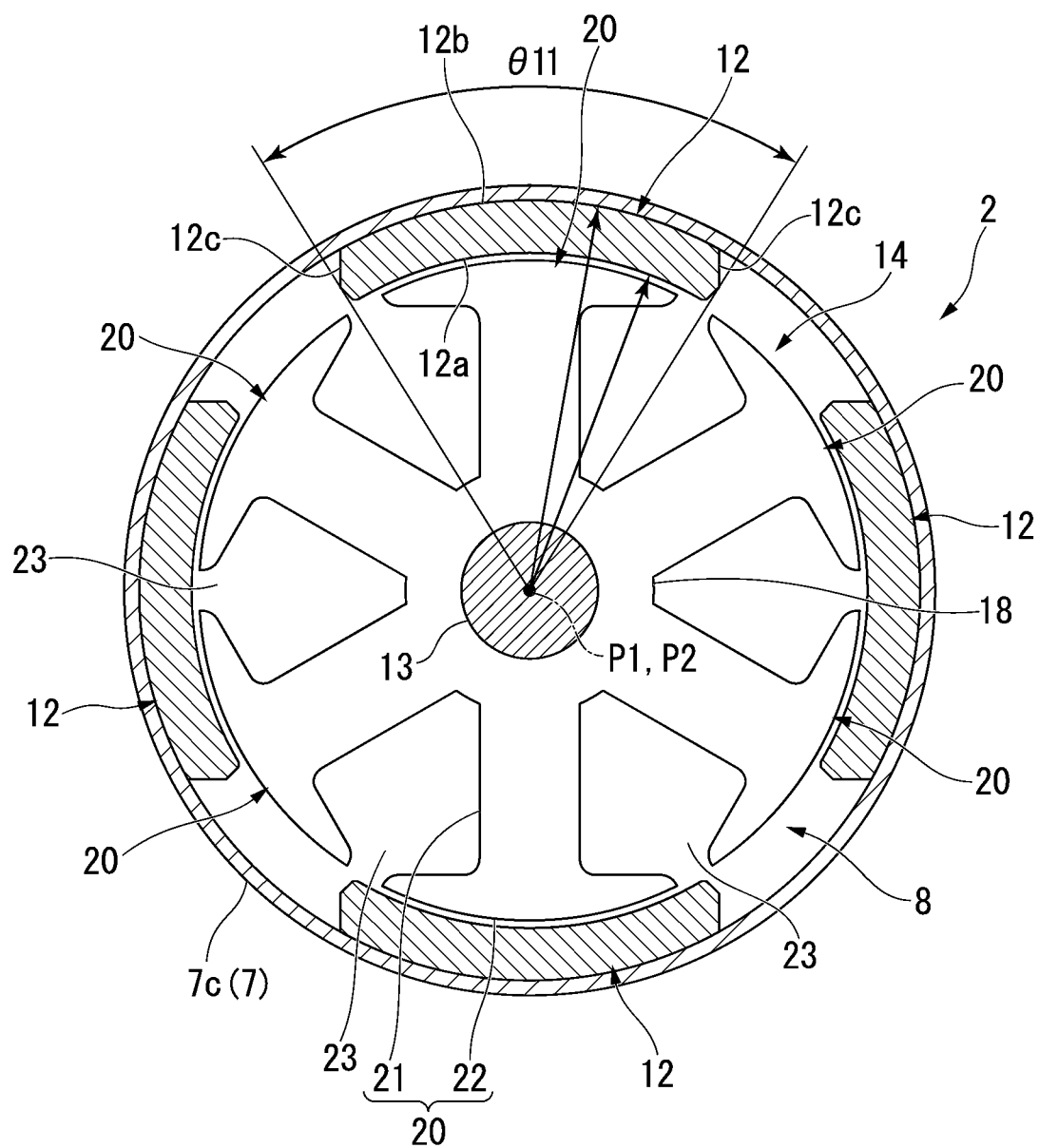
FIG. 2 is a cross-sectional view along an A-A line of FIG. 1.

FIG. 2 is a cross-sectional view along an A-A line of FIG. 1.

As shown in FIG. 1 and FIG. 2, the electric motor 2 is a so-called brush attached motor. The electric motor 2 includes a yoke 7 having a cylindrical shape with a bottom and an armature 8 that is rotatably arranged on an inner side in a radial direction of the yoke 7.

A boss part 9 that protrudes outward in an axial line direction is formed on a middle portion in a radial direction of a bottom part 7a of the yoke 7, and a bearing (not shown)

that pivotally supports one end of a rotation shaft 13 of the armature 8 is provided on the boss part 9.

An outer flange part 10 is provided on an opening part 7b of the yoke 7. A bolt hole (not shown) is formed on the outer flange part 10. A bolt 11 is inserted through the bolt hole and is screwed into a bolt hole (not shown) that is formed on the casing 4 of the speed reduction mechanism 3, and thereby, the yoke 7 is fastened and fixed to the casing 4.

Further, four segment-type permanent magnets 12 are provided on an inner circumferential surface of a cylindrical part 7c of the yoke 7 at even intervals in a circumferential direction such that magnetic poles are in turn. That is, the number of magnetic poles of the permanent magnet 12 that is provided on the yoke 7 is set to 4.

The segment-type permanent magnet 12 is formed in a tegular shape and has an inner surface arc part 12a that faces inward in the radial direction, an outer surface arc part 12b that faces outward in the radial direction and that is formed so as to correspond to an inner circumferential surface shape of the cylindrical part 7c of the yoke 7, and a pair of side surfaces 12c that form both ends in the circumferential direction.

The permanent magnet 12 is formed so as to have a substantially uniform thickness. That is, an arc center P1 of the inner surface arc part 12a and an arc center P2 of the outer surface arc part 12b are not decentered and are arranged at an identical position, that is, a center position in the radial direction of the yoke 7.

Further, a polar arc angle θ11 of the permanent magnet 12 is set so as to satisfy $$50° \leq \theta 11 < 70° \quad (1).$$

Figure 3:
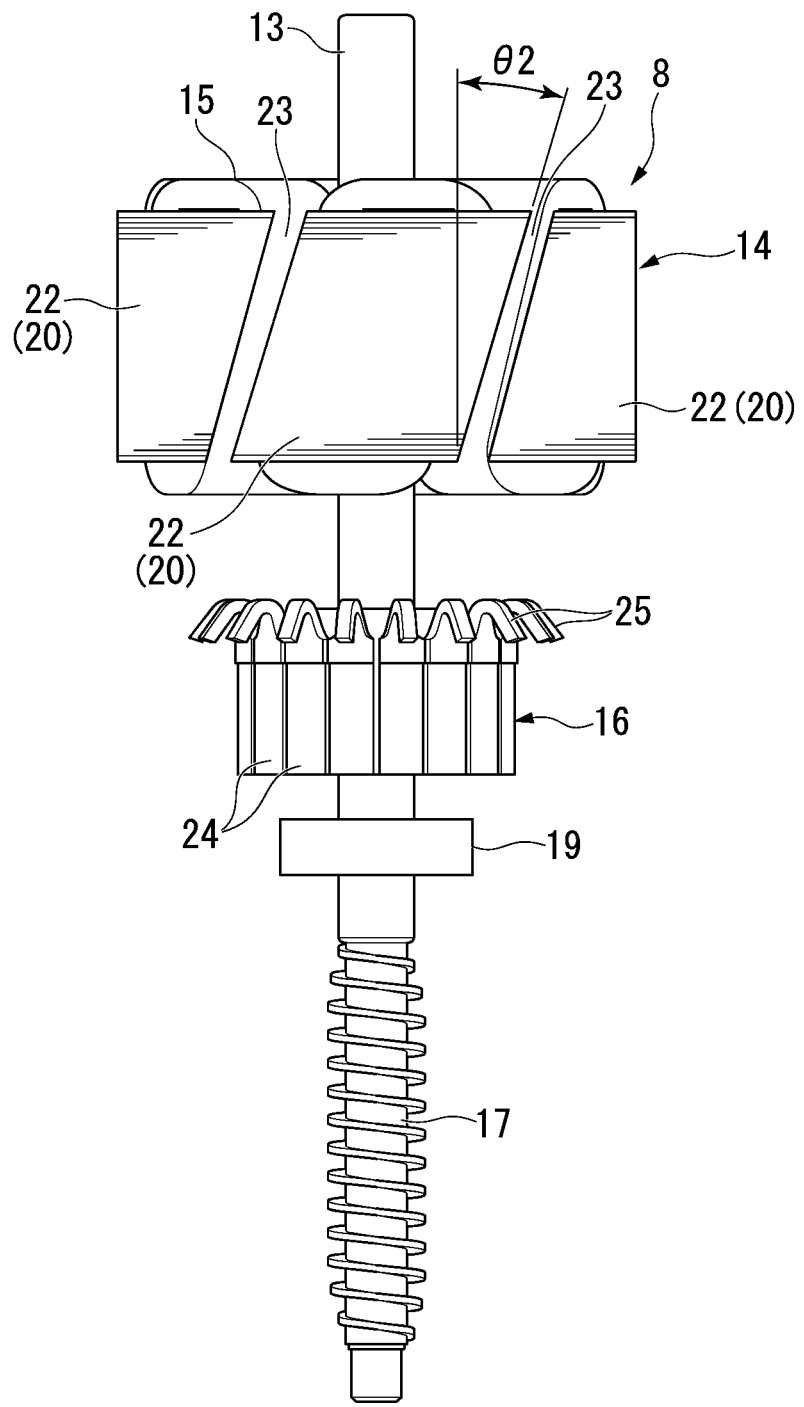
FIG. 3 is a side view of an armature in a first embodiment of the present invention.
Figure 4:
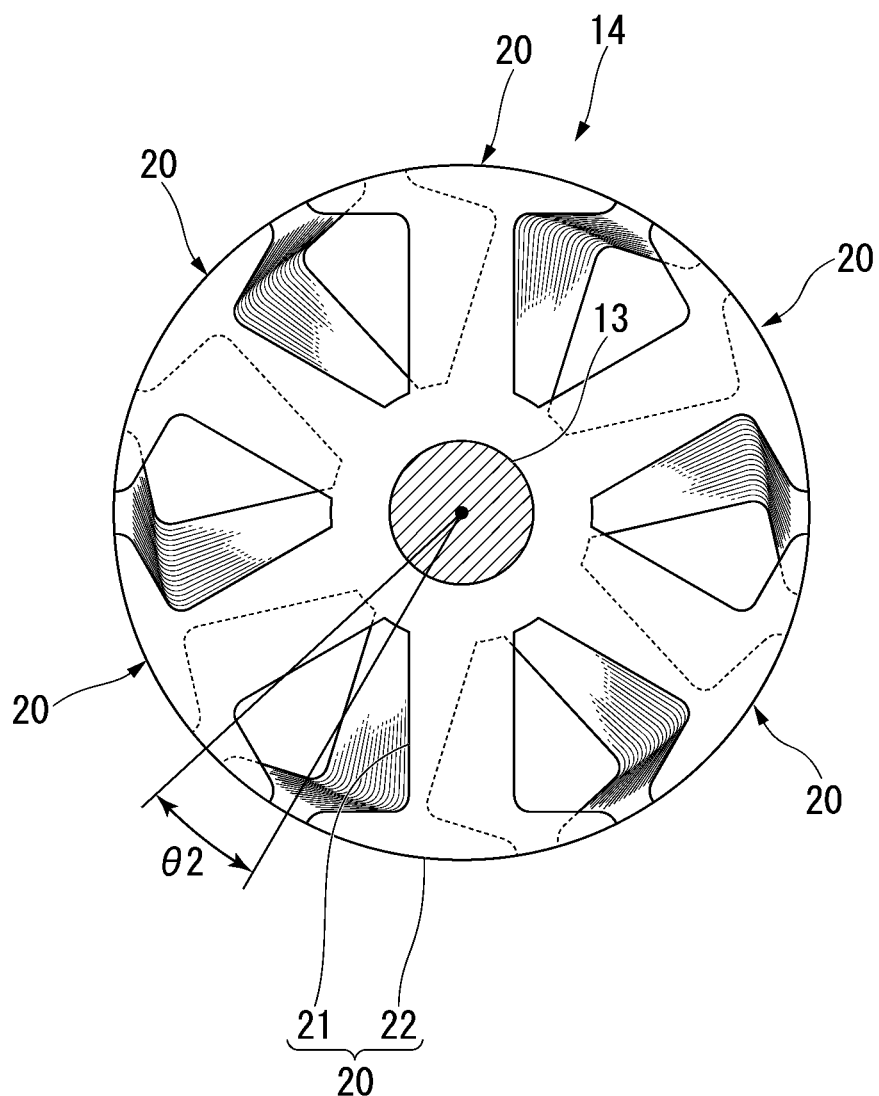
FIG. 4 is a plan view of an armature core seen from an axial direction in the first embodiment of the present invention.

FIG. 3 is a side view of the armature 8. FIG. 4 is a plan view of an armature core 14 seen from the axial direction.

As shown in FIG. 2 to FIG. 4, the armature 8 includes the armature core 14 that is externally fitted and fixed to the rotation shaft 13, a winding wire 15 that is wound around the armature core 14, and a commutator 16 that is externally fitted and fixed to one end side (lower end side in FIG. 3) of the rotation shaft 13.

A worm shaft 17 that constitutes the worm speed reducer is integrally molded on one end of the rotation shaft 13. The worm shaft 17 is meshed to a worm wheel (not shown). The other end (upper end in FIG. 3) of the rotation shaft 13 is rotatably supported by the bearing (not shown) that is provided on the boss part 9 of the yoke 7.

On the other hand, a bearing 19 is provided on one end of the rotation shaft 13. The bearing 19 is attached to a brush holder (not shown) that supplies electric power to the winding wire 15. The brush holder is fixed to the casing 4. That is, the one end of the rotation shaft 13 is rotatably supported by the casing 4 via the bearing 19 and the brush holder.

The armature core 14 is formed by lamination in the axial direction of plate materials of a magnetic material that are punched out by press working or the like (laminate core) or by pressure forming of a soft magnetic powder (power compact core). The armature core 14 has a core main body 18 having a substantially annular shape. The rotation shaft 13 is pressed into and fixed to the center of the core main body 18.

Six teeth 20 having a substantially T shape in a plan view in the axial direction are radially provided on the outer circumferential part of the core main body 18 at even intervals along the circumferential direction. Each of the teeth 20 is formed of a wound body part 21 which extends in the radial direction and around which the winding wire 15 is wound and a flange part 22 that is provided on a front end of the wound body part 21 and that extends so as to be symmetric in a right-to-left direction with respect to the wound body part 21. That is, the flange part 22 that is provided on the front end of the teeth 20 forms an outer circumferential surface of the armature core 14, and the flange part 22 becomes a state of facing the permanent magnet 12.

The teeth 20 are radially provided on the outer circumferential part of the core main body 18, and thereby, six slots 23 having an ant groove shape are formed between adjacent teeth 20. A plurality of slots 23 extend along the axial line direction and are formed at even intervals along the circumferential direction.

The winding wire 15 coated by an enamel is inserted between the slots 23, and the winding wire 15 is wound around the wound body part 21 of the teeth 20 via an insulator (not shown) which is an insulation material.

The teeth 20 and the slot 23 are formed to have a skew angle θ2 so as to diagonally extend with respect to the axial direction of the rotation shaft 13. The skew angle θ2 is set so as to satisfy $$0° < \theta 2 \leq 20° \quad (2).$$

The commutator 16 that is externally fitted and fixed to the one end side of the rotation shaft 13 is formed in a substantially column shape. A plurality of segments 24 that are formed of an electrically conductive material are attached to the outer circumferential surface of the commutator 16. The segments 24 are formed of a metal piece having a plate shape that is elongated in the axial line direction and are fixed in parallel with each other at even intervals along the circumferential direction in a state of being insulated from each other.

A riser 25 that is bent in a folded form in an outer diameter side is integrally molded on an end part on the armature core 14 side of each of the segments 24. A wind starting end and a wind finishing end of the winding wire 15 are hung around the riser 25. Then, the winding wire 15 is fixed to the riser 25 by fusion and the like. Thereby, the segment 24 is electrically connected to a winding wire 15 that corresponds to the segment 24.

The commutator 16 formed in this way becomes a state of facing the casing 4 in a state where the electric motor 2 is attached to the speed reduction mechanism 3. Then, a brush (not shown) of a brush holder (not shown) that is fixed to the casing 4 comes into slidable contact with the segment 24 of the commutator 16. The brush is electrically connected to the connector 6 of the casing 4. Thereby, an electric power of the external electric source is supplied to the winding wire 15 via the brush and the segment 24.

When the electric power is supplied to the winding wire 15, a predetermined magnetic field is generated at the armature core 14. Then, a magnetic suction force or repulsion force works between the magnetic field and the permanent magnet 12 of the yoke 7, and the armature 8 is rotated. According to the rotation, a so-called commutation is performed in which the segment 24 with which the brush (not shown) comes into slidable contact is sequentially changed, and the direction of a current that flows in the winding wire 15 is switched. Then, the armature 8 is continuously rotated.

(Motor Characteristic)

Next, a motor property of the electric motor 2 is described with reference to FIG. 5 and FIG. 6.

Figure 5:
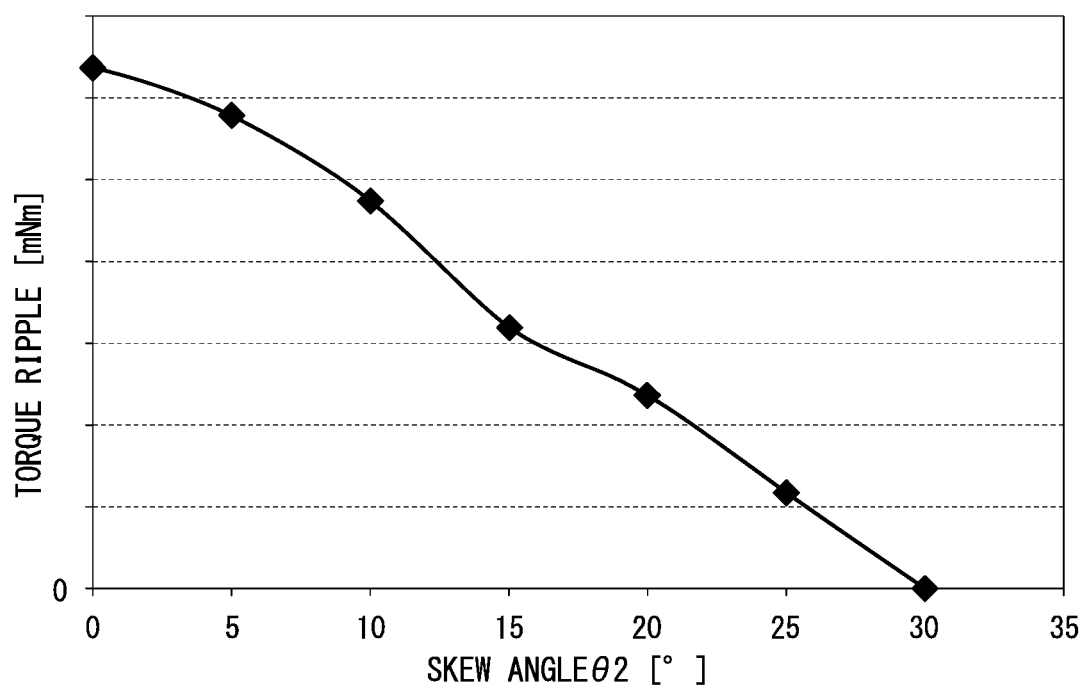
FIG. 5 is a graph showing a change in a torque ripple of an electric motor in the first embodiment of the present invention.

FIG. 5 is a graph showing a change in a torque ripple when the vertical axis is a torque ripple [mN·m] of the electric motor 2, and the horizontal axis is a skew angle θ2 [°] of the armature core 14.

Figure 6:
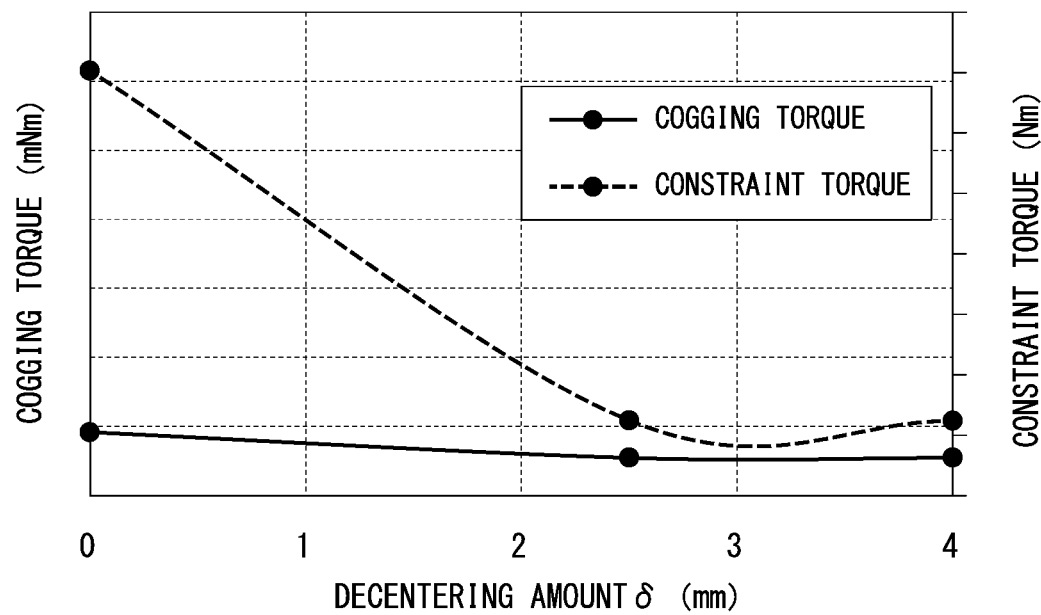
FIG. 6 is a graph showing a change in a cogging torque of the electric motor in the first embodiment of the present invention.

FIG. 6 is a graph showing a change in a cogging torque when the vertical axis is a cogging torque [mN·m] of the electric motor 2, and the horizontal axis is a decentering amount δ [mm] between the arc center P1 of the inner surface arc part 12a and the arc center P2 of the outer surface arc part 12b in the permanent magnet 12.

In FIG. 5 and FIG. 6, the polar arc angle θ11 of the permanent magnet 12 satisfies Expression (1).

As shown in FIG. 5, it can be confirmed that the torque ripple of the electric motor 2 is smaller as the skew angle θ2 is larger. Since the number of the magnetic poles of the electric motor 2 is 4, and the number of the slots 23 is 6, the optimum skew angle θ2 is 360°/12=30°, and it can be confirmed that the torque ripple is substantially 0 [mN·m] in the case of θ2=30°.

As shown in FIG. 5, it can be confirmed that the decrease gradient of the torque ripple is slightly moderated when the skew angle θ2 is in a range of 15°≤θ2≤20°. Therefore, in the electric motor 2, the skew angle θ2 is set such that Expression (2) is satisfied.

In this case, as shown in FIG. 6, as the decentering amount δ is increased, it can be confirmed that the cogging torque is little decreased, and it can be confirmed that a constraint torque is greatly decreased. Therefore, in the electric motor 2, the decentering amount δ is set to 0 mm, that is, the thickness of the permanent magnet 12 is set to be substantially constant.

Therefore, according to the first embodiment described above, it is possible to minimize the cogging torque and the torque ripple without setting the skew angle to an optimum skew angle that is obtained from the number of magnetic poles and the number of slots. Therefore, it is possible to provide an electric motor 2 having an excellent motor efficiency without degrading a work efficiency.

Second Embodiment (Electric Motor)

Next, a second embodiment of the present invention is described with reference to FIG. 7 and FIG. 8. In the following description, the same reference numerals are given to the same configurations as the first embodiment (similarly also with respect to the following embodiment).

Figure 7:
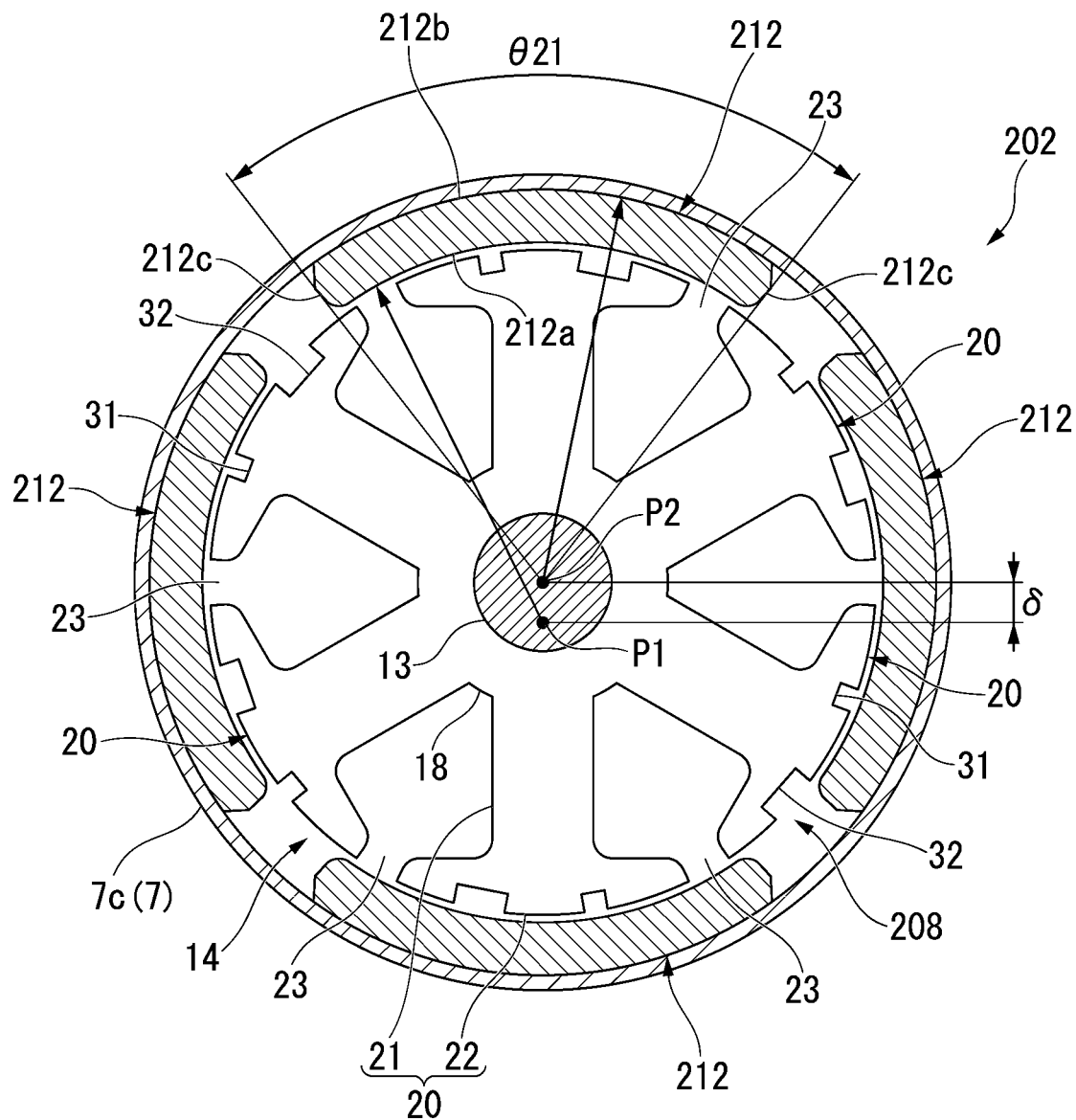
FIG. 7 is a cross-sectional view of an electric motor in a second embodiment of the present invention.

FIG. 7 is a cross-sectional view that is orthogonal to the axial direction of an electric motor 202 in the second embodiment. FIG. 7 corresponds to FIG. 2 described above. FIG. 8 is a side view of an armature 208 and corresponds to FIG. 3 described above. FIG. 9 is a plan view of an armature core 14 seen from the axial direction and corresponds to FIG. 4 described above.

Figure 8:
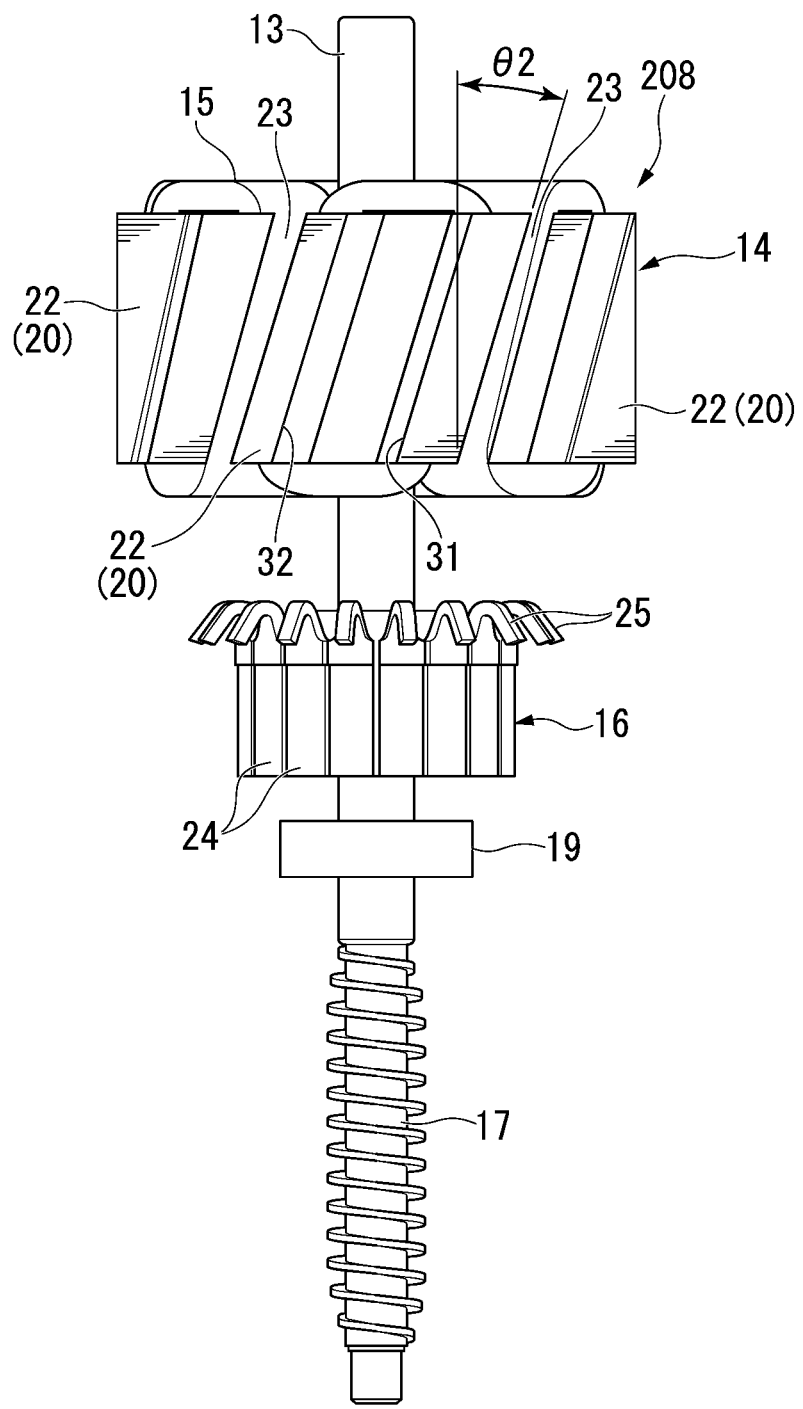
FIG. 8 is a side view of an armature in the second embodiment of the present invention.
Figure 9:
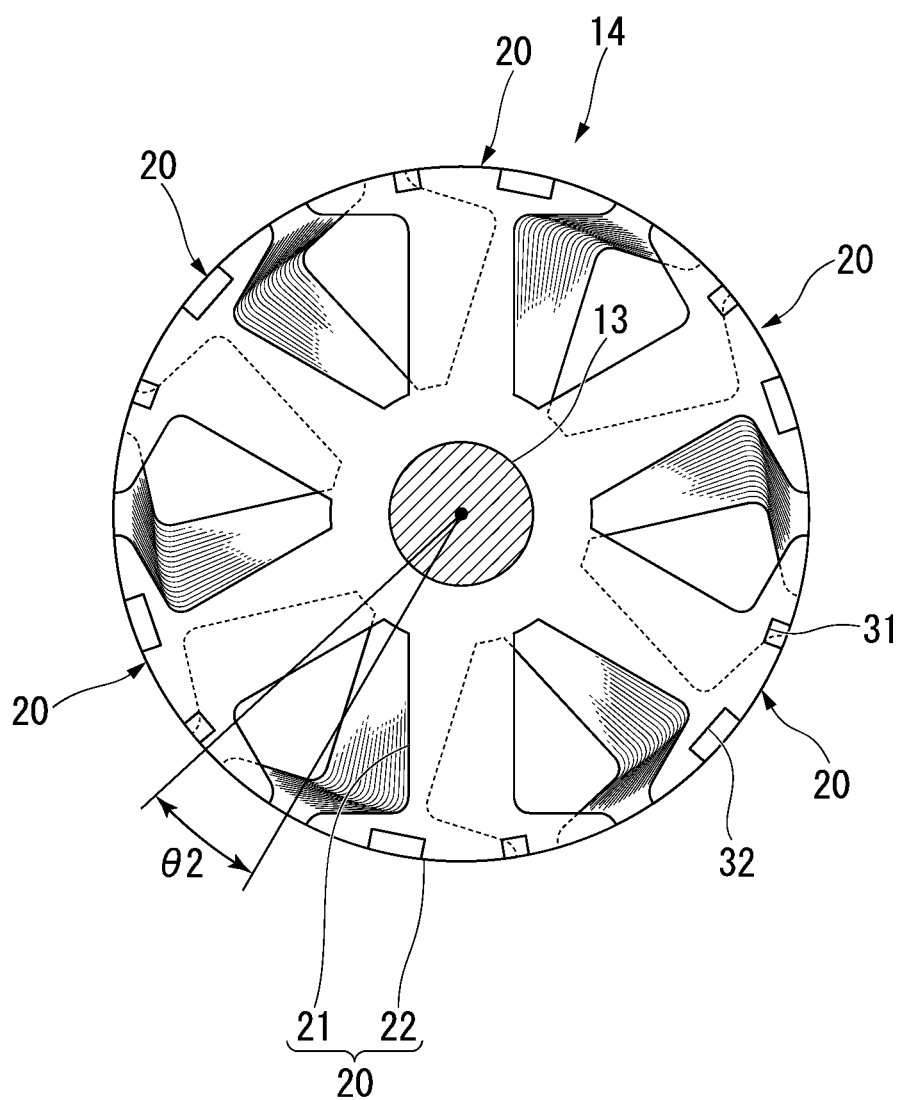
FIG. 9 is a plan view of an armature core seen from an axial direction in the second embodiment of the present invention.

As shown in FIG. 7 to FIG. 9, the difference between the first embodiment described above and the second embodiment is that the shape of a permanent magnet 212 of the yoke 7 and the shape of the teeth 20 of the armature core 14 are different between the first and second embodiments.

More specifically, four segment-type permanent magnets 212 that are provided on an inner circumferential surface of a cylindrical part 7c of the yoke 7 is formed in a tegular shape. The four segment-type permanent magnets 212 have an inner surface arc part 212a that faces inward in the radial direction, an outer surface arc part 212b that faces outward in the radial direction and that is formed so as to correspond to an inner circumferential surface shape of the cylindrical part 7c of the yoke 7, and a pair of side surfaces 212c that form both ends in the circumferential direction.

In the permanent magnet 212, an arc center P1 of the inner surface arc part 212a is decentered with respect to an arc center P2 of the outer surface arc part 212b. The decentering direction is a direction away from the permanent magnet 212 along a thickness direction of the permanent magnet 212 from the arc center P2 of the outer surface arc part 212b. That is, the arc center P2 of the outer surface arc part 212b is arranged at a middle position in the radial direction of the yoke 7. On the other hand, the arc center P1 of the inner surface arc part 212a is present at a position that is displaced downward in FIG. 7 from the middle position in the radial direction of the yoke 7.

A decentering amount δ between the arc center P1 of the inner surface arc part 212a and the arc center P2 of the outer surface arc part 212b is set so as to satisfy $$0 \text{ mm} < \delta < 3 \text{ mm} \tag{3}$$

A polar arc angle θ21 of the permanent magnet 212 is set so as to satisfy $$70° \leq θ21 < 80° \tag{4}$$

On the other hand, two grooves 31, 32 are formed on an outer circumferential surface of the flange part 22 of the teeth 20 of the armature core 14 throughout the entire axial direction. The grooves 31, 32 are arranged side-by-side on both sides in the circumferential direction of the center of the wound body part 21 of the teeth 20. The grooves 31, 32 are formed to have a skew angle θ2 along an extension direction of the teeth 20.

Further, the grooves 31, 32 are formed so as to have a different groove width from each other. That is, a groove width of a first groove 31 of two grooves 31, 32 is set to be narrower than a groove width of a second groove 32 of the two grooves 31, 32.

The skew angle θ2 of the teeth 20 and the slot 23 satisfies Expression (2) described above.

In such a configuration, the cogging torque is gradually decreased as the decentering amount δ between the arc center P1 of the inner surface arc part 12a and the arc center P2 of the outer surface arc part 12b of the permanent magnet 212 is increased from 0 mm, and conversely, the cogging torque is increased as the decentering amount δ is increased from 2.5 mm.

That is, a graph showing a change in a cogging torque when the vertical axis is a cogging torque [mN·m] of the electric motor 202, and the horizontal axis is a decentering amount δ [mm] between the arc center P1 of the inner surface arc part 212a and the arc center P2 of the outer surface arc part 212b in the permanent magnet 212 is a graph having a V shape having a bottom in the vicinity of the decentering amount δ=2.5 mm.

Therefore, according to the second embodiment described above, by setting the decentering amount δ between the arc center P1 of the inner surface arc part 212a and the arc center P2 of the outer surface arc part 212b in the permanent magnet 212 such that Expression (3) described above is satisfied, by setting the polar arc angle θ21 of the permanent magnet 212 such that Expression (4) described above is satisfied, and by forming the two grooves 31, 32 on the outer circumferential surface of the flange part 22 of the teeth 20, it is possible to provide an advantage similar to the first embodiment described above.

Third Embodiment (Electric Motor)

Next, a third embodiment of the present invention is described with reference to FIG. 10 and FIG. 11.

Figure 10:
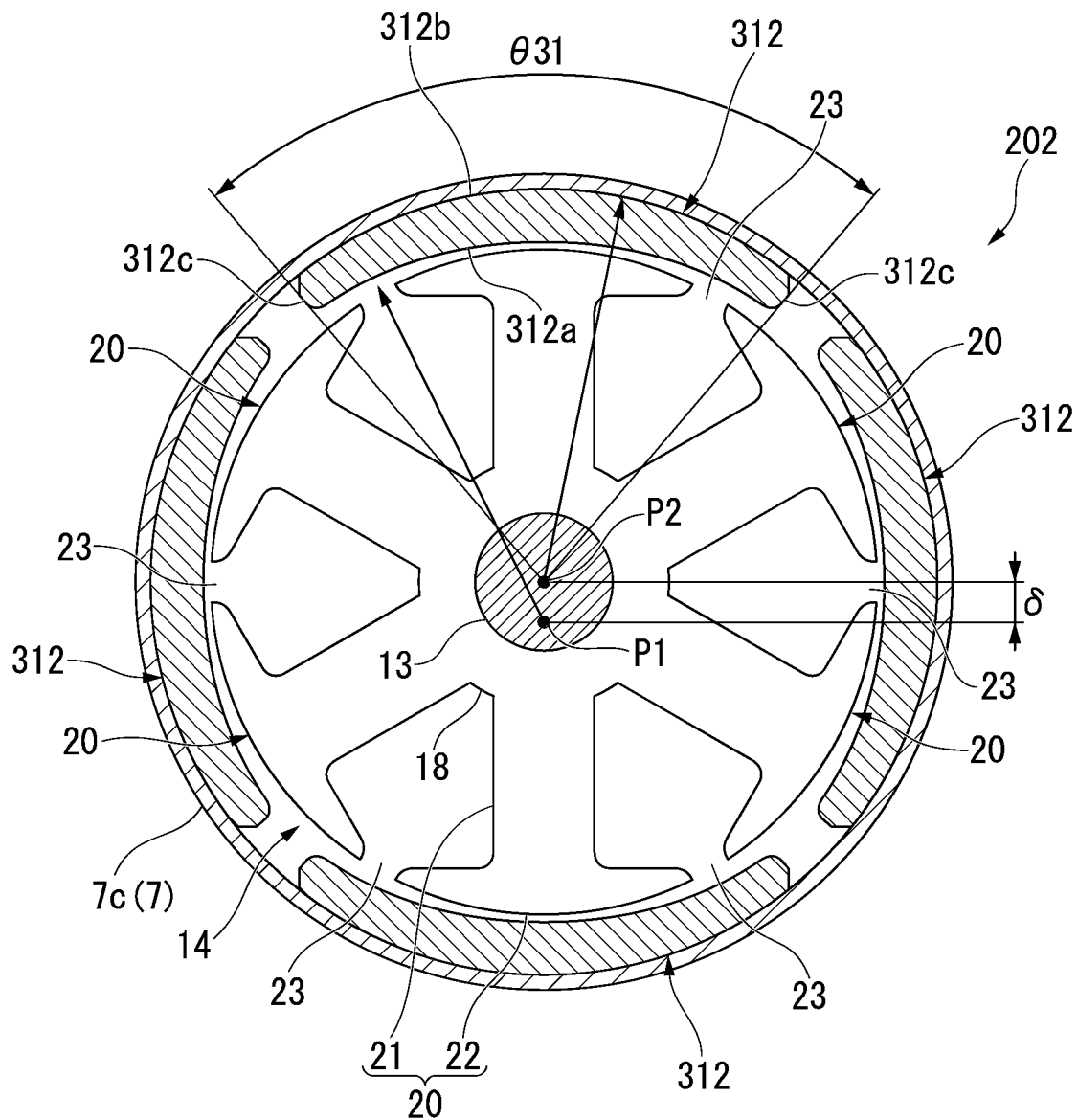
FIG. 10 is a cross-sectional view of an electric motor in a third embodiment of the present invention.

FIG. 10 is a cross-sectional view that is orthogonal to the axial direction of an electric motor 302 in the third embodiment. FIG. 10 corresponds to FIG. 2 described above.

As shown in FIG. 10, the difference between the first embodiment described above and the third embodiment is that the shape of a permanent magnet 312 of the yoke 7 is different between the first and third embodiments.

More specifically, four segment-type permanent magnets 312 that are provided on an inner circumferential surface of a cylindrical part 7c of the yoke 7 is formed in a tegular shape. The four segment-type permanent magnets 312 have an inner surface arc part 312a that faces inward in the radial direction, an outer surface arc part 312b that faces outward in the radial direction and that is formed so as to correspond to an inner circumferential surface shape of the cylindrical part 7c of the yoke 7, and a pair of side surfaces 312c that form both ends in the circumferential direction.

In the permanent magnet 312, an arc center P1 of the inner surface arc part 312a is decentered with respect to an arc center P2 of the outer surface arc part 312b. The decentering direction is a direction away from the permanent magnet 312 along a thickness direction of the permanent magnet 312 from the arc center P2 of the outer surface arc part 312b. That is, the arc center P2 of the outer surface arc part 312b is arranged at a middle position in the radial direction of the yoke 7. On the other hand, the arc center P1 of the inner surface arc part 312a is present at a position that is displaced downward in FIG. 10 from the middle position in the radial direction of the yoke 7.

A decentering amount δ between the arc center P1 of the inner surface arc part 312a and the arc center P2 of the outer surface arc part 312b is set so as to satisfy $$3\text{ mm} \leq \delta \leq 4\text{ mm} \quad (5).$$

A polar arc angle θ31 of the permanent magnet 312 is set so as to satisfy $$80° \leq \theta 31 < 90° \quad (6).$$

In the third embodiment, the skew angle θ2 of the teeth 20 and the slot 23 satisfies Expression (2) described above (not specifically shown in the drawings).

Figure 11:
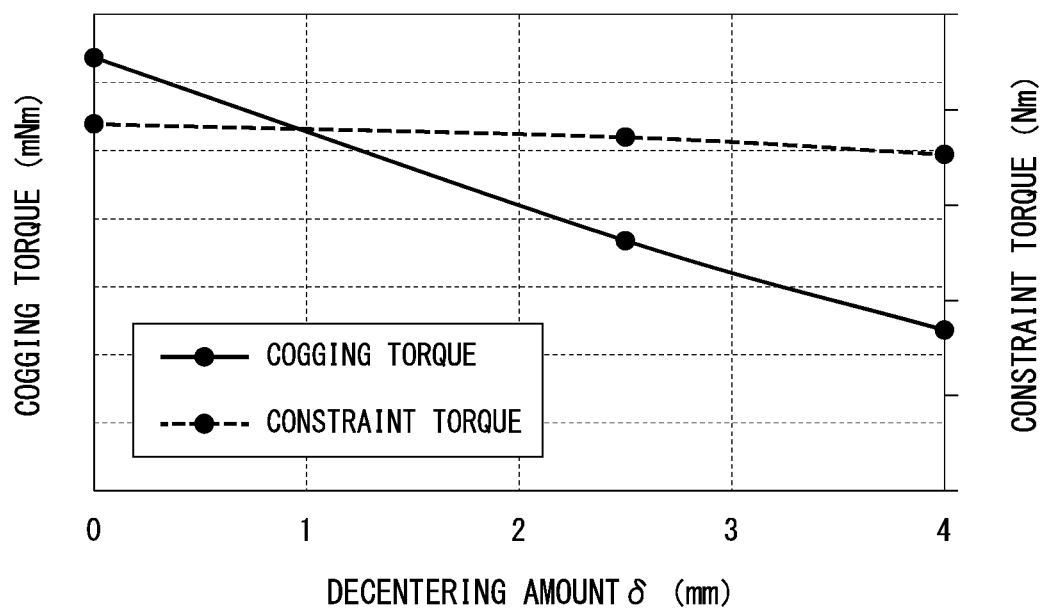
FIG. 11 is a graph showing a change in a cogging torque of the electric motor in the third embodiment of the present invention.

FIG. 11 is a graph showing a change in a cogging torque when the vertical axis is a cogging torque [mN·m] of the electric motor 302, and the horizontal axis is a decentering amount δ [mm] between the arc center P1 of the inner surface arc part 312a and the arc center P2 of the outer surface arc part 312b in the permanent magnet 312.

In FIG. 11, the polar arc angle θ31 of the permanent magnet 312 satisfies Expression (6).

As shown in FIG. 11, it can be confirmed that the cogging torque is reduced as the decentering amount δ is increased. On the other hand, it is found that a constraint torque is little reduced to the vicinity of a decentering amount of 2.5 mm, and it can be confirmed that the decrease gradient is gradually increased beyond 2.5 mm. Therefore, in the electric motor 302, the decentering amount δ is set such that Expression (5) is satisfied.

Therefore, according to the third embodiment described above, by setting the decentering amount δ between the arc center P1 of the inner surface arc part 312a and the arc center P2 of the outer surface arc part 312b in the permanent magnet 312 such that Expression (5) described above is satisfied and by setting the polar arc angle θ31 of the permanent magnet 312 such that Expression (6) described above is satisfied, it is possible to provide an advantage similar to the first embodiment described above.

The present invention is not limited to the embodiments described above, and various changes can be added to the embodiments described above without departing from the scope of the present invention.

For example, the above embodiments are described using a case in which the electric motors 2, 202, 302 are joined to the speed reduction mechanism 3 to obtain the speed reducer attached motor 1, and the speed reducer attached motor 1 is used as a wiper motor of an automobile. However, the present invention is not limited thereto, and it is possible to use the electric motors 2, 202, 302 alone for a variety of apparatuses. Further, it is possible to use the speed reducer attached motor 1 also for a variety of apparatuses.

INDUSTRIAL APPLICABILITY

According to the electric motor described above, it is possible to minimize a cogging torque and a torque ripple without setting a skew angle to an optimum skew angle that is obtained from the number of magnetic poles and the number of slots. Therefore, it is possible to provide an electric motor having an excellent motor efficiency without degrading a work efficiency.

DESCRIPTION OF THE REFERENCE SYMBOLS

1 . . . speed reducer attached motor
2, 202, 302 . . . electric motor
7 . . . yoke
7c . . . cylindrical part
8 . . . armature
12, 212, 312 . . . permanent magnet
12a, 212a, 312a . . . inner surface arc part (inner surface)
12b, 212b, 312b . . . outer surface arc part (outer surface)
13 . . . rotation shaft
14 . . . armature core
16 . . . commutator
20 . . . teeth
23 . . . slot
24 . . . segment
31 . . . first groove (groove)
32 . . . second groove (groove)
θ11, θ21, θ31 . . . polar arc angle
θ2 . . . skew angle
δ . . . decentering amount

The invention claimed is:

1. An electric motor comprising
a yoke having a cylindrical part,
four segment-type permanent magnets that are provided on an inner circumferential surface of the cylindrical part, and
an armature that is rotatably supported on an inner side in a radial direction of the yoke, wherein
the permanent magnet is formed so as to have a uniform thickness such that an outer surface and an inner surface have an arc shape, the armature comprises
  a rotation shaft,
  an armature core that is fixed to the rotation shaft, and
  a commutator which is provided on the rotation shaft so as to be adjacent to the armature core and in which a plurality of segments are arranged in a circumferential direction,
the armature core comprises
  six teeth which radially extend along a radial direction and around which a coil is wound and
  six slots that are formed between the teeth and that extend along an axial direction,
the teeth and the slots are formed to have a skew angle so as to diagonally extend with respect to an axial direction of the rotation shaft, and
when a polar arc angle of the permanent magnet is θ1 and the skew angle is θ2, the polar arc angle θ1 and the skew angle θ2 are set so as to satisfy $50° \leq θ1 < 70°$ and $0° < θ2 \leq 20°$.

2. An electric motor comprising
a yoke having a cylindrical part,
four segment-type permanent magnets that are provided on an inner circumferential surface of the cylindrical part, and
an armature that is rotatably supported on an inner side in a radial direction of the yoke, wherein
the permanent magnet is formed such that an outer surface and an inner surface have an arc shape,
an arc center of the inner surface is further decentered toward a direction away from the permanent magnet along a thickness direction of a middle portion in a circumferential direction of the permanent magnet than an arc center of the outer surface,
the armature comprises
  a rotation shaft,
  an armature core that is fixed to the rotation shaft, and
a commutator which is provided on the rotation shaft so as to be adjacent to the armature core and in which a plurality of segments are arranged in a circumferential direction,
the armature core comprises
  six teeth which radially extend along a radial direction and around which a coil is wound and
  six slots that are formed between the teeth and that extend along an axial direction,
two grooves having a different groove width from each other are formed on a surface that faces the permanent magnet of the teeth throughout an entire axial direction of the rotation shaft,
the teeth and the slots are formed to have a skew angle so as to diagonally extend with respect to the axial direction, and
when a decentering amount of the arc center of the inner surface of the permanent magnet is δ, a polar arc angle of the permanent magnet is θ1 and the skew angle is θ2, the decentering amount δ, the polar arc angle θ1 and the skew angle θ2 are set so as to satisfy $0 \text{ mm} < δ < 3 \text{ mm}$, $70° \leq θ1 < 80°$ and $0° < θ2 \leq 20°$.

3. An electric motor comprising
a yoke having a cylindrical part,
four segment-type permanent magnets that are provided on an inner circumferential surface of the cylindrical part, and
an armature that is rotatably supported on an inner side in a radial direction of the yoke, wherein
the permanent magnet is formed such that an outer surface and an inner surface have an arc shape,
an arc center of the inner surface is further decentered toward a direction away from the permanent magnet along a thickness direction of a middle portion in a circumferential direction of the permanent magnet than an arc center of the outer surface,
the armature comprises
  a rotation shaft,
  an armature core that is fixed to the rotation shaft, and
  a commutator which is provided on the rotation shaft so as to be adjacent to the armature core and in which a plurality of segments are arranged in a circumferential direction,
the armature core comprises
  six teeth which radially extend along a radial direction and around which a coil is wound and
  six slots that are formed between the teeth and that extend along an axial direction,
the teeth and the slots are formed to have a skew angle so as to diagonally extend with respect to an axial direction of the rotation shaft, and
when a decentering amount of the arc center of the inner surface of the permanent magnet is δ, a polar arc angle of the permanent magnet is θ1 and the skew angle is θ2, the decentering amount δ, the polar arc angle θ1 and the skew angle θ2 are set so as to satisfy $3 \text{ mm} \leq δ \leq 4 \text{ mm}$, $80° \leq θ1 < 90°$ and $0° < θ2 \leq 20°$.

* * * * *